(12) United States Patent
Amano et al.

(10) Patent No.: US 9,012,526 B2
(45) Date of Patent: Apr. 21, 2015

(54) INTERCONNECTED CELL POROUS BODY AND MANUFACTURING METHOD THEREOF

(75) Inventors: Masaki Amano, Settsu (JP); Takeshi Sugiyama, Settsu (JP); Shinichi Fukunaga, Settsu (JP)

(73) Assignee: Kaneka Corporation, Osaka (JP)

( * ) Notice: Subject to any disclaimer, the term of this patent is extended or adjusted under 35 U.S.C. 154(b) by 522 days.

(21) Appl. No.: 13/510,837

(22) PCT Filed: Nov. 18, 2010

(86) PCT No.: PCT/JP2010/070572
§ 371 (c)(1),
(2), (4) Date: May 18, 2012

(87) PCT Pub. No.: WO2011/062224
PCT Pub. Date: May 26, 2011

(65) Prior Publication Data
US 2012/0225967 A1 Sep. 6, 2012

(30) Foreign Application Priority Data

Nov. 19, 2009 (JP) .................................. 2009-264110
May 14, 2010 (JP) .................................. 2010-111812

(51) Int. Cl.
| | | |
|---|---|---|
| *C08L 67/04* | (2006.01) | |
| *A01G 9/10* | (2006.01) | |
| *C08J 9/14* | (2006.01) | |
| *C08J 9/33* | (2006.01) | |
| *C08J 9/16* | (2006.01) | |
| *A01G 31/00* | (2006.01) | |

(52) U.S. Cl.
CPC ........ *A01G 9/1086* (2013.01); *A01G 2031/003* (2013.01); *C08J 9/141* (2013.01); *C08J 9/33* (2013.01); *C08J 2205/05* (2013.01); *C08J 2367/04* (2013.01); *A01G 31/001* (2013.01); *C08J 9/16* (2013.01); *C08J 2201/03* (2013.01); *C08J 2203/14* (2013.01); *C08J 2203/182* (2013.01); *C08J 2300/16* (2013.01)

(58) Field of Classification Search
CPC ................ C08J 9/141; C08J 9/16; C08J 9/33; C08J 2201/03; C08J 2203/14; C08J 2203/182; C08J 2205/05; C08J 2300/16; C08J 2367/04
USPC .................................................. 521/182, 189
See application file for complete search history.

(56) References Cited

U.S. PATENT DOCUMENTS 6,310,171 B1   10/2001   Naito et al.

FOREIGN PATENT DOCUMENTS

| JP | 2000-217683 A | | 8/2000 |
|---|---|---|---|
| JP | 2001-098105 A | | 4/2001 |
| JP | 2002226623 A | * | 8/2002 |
| JP | 2006-306983 A | | 11/2006 |
| JP | 2008-056869 A | | 3/2008 |
| JP | 2009-506149 A | | 2/2009 |
| JP | 2009242545 A | * | 10/2009 |
| WO | WO-99/21915 A1 | | 5/1999 |
| WO | WO-2007023089 | | 3/2007 |
| WO | WO-2009/119325 A1 | | 10/2009 |

* cited by examiner

*Primary Examiner* — Irina S Zemel

(74) *Attorney, Agent, or Firm* — Novak Druce Connolly Bove + Quigg LLP

(57) ABSTRACT

Disclosed is a water absorbent material and an interconnected cell porous body which can be optimally used as a flower arranging pedestal and a plant culture medium. The interconnected cell porous body is formed from a resin composition with a polylactic acid-based resin as the main component. The pore walls, formed by joining together the crushed powder fragments formed by crushing the foam of the aforementioned resin composition, form the interconnected cell structure of the aforementioned porous body. The apparent density greater of the interconnected cell porous body is than or equal to 0.01 g/cm3 and a less than or equal to 0.2 g/cm3; the 10% compression stress is greater than or equal to 0.02 MPa and less than or equal to 0.3 MPa; and the compression recovery rate is less than or equal to 95%. The water absorbent material comprises the interconnected cell porous body.

20 Claims, 2 Drawing Sheets

INTERCONNECTED CELL POROUS BODY AND MANUFACTURING METHOD THEREOF

CROSS REFERENCE TO RELATED APPLICATIONS

This application is a National Phase filing under 35 U.S.C. §371 of PCT/JP2010/070572 filed on Nov. 18, 2010; and this application claims priority to Application No. 2010-111812 filed in Japan on May 14, 2010, and Application No. 2009-264110 filed in Japan on Nov. 19, 2009, under 35 U.S.C. §119; the entire contents of all are hereby incorporated by reference.

TECHNICAL FIELD

The present invention relates to an interconnected cell porous body and a manufacturing method for the interconnected cell porous body.

BACKGROUND ART

Porous bodies are solids containing many pores. The structure in which these pores are connected to each other is called interconnected cell structure. Porous bodies having the interconnected cell structure often have a property of absorbing liquid.

For example, polyurethane foams having the interconnected cell structure have been used widely as cleaning sponges for tableware, because of their favorable water-absorbing efficiency. In addition, polyurethane foams and phenol foams having the interconnected cell structure have been used as flower-arrangement holders. Interconnected cell porous bodies are used in this application because of their water-absorbing efficiency and such a product has a function to keep flowers fresh for an extended period of time. Alternatively, in the field of agriculture, interconnected-cell porous bodies obtained by bonding rock wools are being used as a medium for use for example in nutriculture. An interconnected-cell porous body used in this application has functions to hold firmly the root of plants to be cultivated and supply nutrient-containing water to the plants by absorbing it by itself.

As described above, interconnected-cell porous bodies are very useful. In addition, among the interconnected-cell porous bodies for use as flower-arrangement holders and media for example for plant nutriculture, those that are made of a biodegradable resin are easily decomposed in the environment and thus have an advantage that they can be disposed easily after use and thus, they are highly useful.

Patent Document 1 discloses, as such a biodegradable porous body, a porous polylactic acid material of a polymer containing lactic acid as a principal component and having interconnected pores of an average pore size of 1 to 30 μm. The porous body is prepared by dissolving a polymer containing lactic acid as a principal component and a copolymer of a water-soluble polyalkylene ether and lactic acid in a solvent, drying the solution to solid matter, and removing the copolymer by elution with another liquid. However, this production method is very complicated in procedure and has a problem that it easily leads to increase in cost. Although a film-shaped product can be prepared easily the production method also has problems that the interconnected structure can change easily during drying and it is difficult to obtain products with relatively larger thickness.

Alternatively, Patent Document 2 discloses an interconnected-cell body containing as a principal component a biodegradable plastic that is manufactured by blending, extruding, and expanding a mixture of a biodegradable resin, an expanding agent, an inorganic filler and others, and a flower-arrangement holder produced from the same. However, it is difficult to obtain a favorable interconnected cell structure only by molding a biodegradable plastic together with an expanding agent or the like. In addition, the extrusion expanding method has limitation in the shape of the molding obtained and does not always permit molding into a desired shape.

Yet alternatively, Patent Document 3 discloses use of a foam of an aliphatic polyester such as a polylactic acid resin as a flower-arrangement holder. However, the aliphatic polyester resin foam does not have a pore structure suitable for water absorption, although it is an interconnected cell foam, and thus absorbs water slowly and shows insufficient water-absorbing efficiency.

Patent Document 4 discloses a production method of preparing a foam by pressurizing expandable particles having a polymer coat in a mold, thus performing heating without use of steam, and describes that pulverized particles obtained from the foam by recycling were used as the expandable particles. However, Patent Document 4 uses preliminary expanded particles of an expandable polyolefin or styrene polymer as expandable particles and there is no description on biodegradable polymers in the Patent Document 4. Patent Document 4 also does not contain any description on pulverized particles obtained from the foam. Patent Document 4 further does not contain any description on foams having an interconnected cell structure.

CITATION LIST

Patent Literature

Patent Document 1: JP-A No. 2006-306983
Patent Document 2: JP-A No. 2000-217683
Patent Document 3: WO2009/119325
Patent Document 4: JP-A No. 2009-506149

SUMMARY OF INVENTION

Technical Problem

An object of the present invention is to provide a porous body having an interconnected cell structure that can absorb water, and being made of a biodegradable resin, which can be disposed easily after use because it is degradable in the environment, and a production method thereof.

Another object of the invention is to provide a method of producing an interconnected cell porous body made of such a biodegradable resin, permitting production of large-sized moldings uniform in the thermal bonding state both in the internal and external regions thereof, easily and at high productivity in a short period of time.

Yet another object of the present invention is to provide a water-absorbing material that absorbs water and is biodegradable.

Solution to Problem

After intensive studies to achieve the objects above, the inventors have found that a porous body of a resin composition containing polylactic acid resin as a principal component, in which micropore walls manufactured by bonding of powdery fragments obtained by pulverization of the foam thereof forms an interconnected cell structure, has a favorable interconnected cell structure and shows excellent water-absorbing efficiency. The inventors have also found that the porous body above shows extremely favorable water-absorbing efficiency when it contains a certain amount of a surfactant. The inventors also found that it is possible to obtain a large-sized molding made of a powder of a resin composition containing a polylactic acid resin as a principal component, in which the powdery fragments are thermally bonded to each other uniformly, by heating the interconnected cell porous body during molding in an atmosphere containing steam at a temperature of 60 and 140° C. and a relative humidity 20% or more. The present invention was made based on these findings.

The present invention provides an interconnected cell porous body comprising a resin composition containing a polylactic acid resin as a principal component, wherein: the micropore walls formed by mutual bonding of powdery fragments obtained by pulverization of a foam of the resin composition form an interconnected cell structure of the porous body; the apparent density of the interconnected cell porous body is 0.01 g/cm$^3$ or more and 0.2 g/cm$^3$ or less; the 10% compressive stress of the interconnected cell porous body is 0.02 MPa or more and 0.3 MPa or less; and the compression recovery rate of the interconnected cell porous body is 95% or less.

In an embodiment, the powdery fragments are bonded to each other by thermal bonding.

In an embodiment, the powder has a bulk density of 0.001 g/cm$^3$ or more and 0.1 g/cm$^3$ or less.

In an embodiment, the powder has an average diameter of 100/μm or more and 2,000 μm or less.

In an embodiment, the foam of the resin composition is hydrolyzed.

In an embodiment, the interconnected cell porous body contains a surfactant.

The present invention also relates to a method of producing an interconnected cell porous body including a resin composition containing a polylactic acid resin as a principal component, wherein the porous body has an apparent density of 0.01 g/cm$^3$ or more and 0.2 g/cm$^3$ or less, a 10% compressive stress of 0.02 MPa or more and 0.3 MPa or less and a compression recovery rate of 95% or less.

Provided is a method of producing an interconnected cell porous body characterized by containing steps (1) to (3):
(1) a foam-preparing step of preparing a foam by expanding a resin composition containing a polylactic acid resin as a principal component,
(2) a powder-preparing step of preparing a powder by pulverization of the foam, and
(3) a porous body-preparing step of preparing a porous body having an interconnected cell structure by molding the powder into a particular shape, bonding the powdery fragments of the foam to each other and thus forming micropore walls.

In an embodiment, the thermal bonding is performed by heating.

In an embodiment, the heating is performed under an atmosphere containing steam at a temperature of 60 to 140° C. and a relative humidity of 20% or more.

In another embodiment, the heating is performed under an atmosphere at a relative humidity of 60 to 100%.

In an embodiment, the powder has a bulk density of 0.001 g/cm$^3$ or more and 0.1 g/cm$^3$ or less.

In an embodiment, the powder has an average diameter of 100 μm or more and 2,000 μm or less.

In an embodiment, the foam is hydrolyzed after the foam-preparing step and before the powder-preparing step.

In an embodiment, the interconnected cell porous body contains a surfactant that is added in the foam-preparing step or in the porous body-preparing step.

The present invention also provides a water-absorbing material including the interconnected cell porous body of the present invention or an interconnected cell porous body manufactured by the production method of the present invention.

Advantageous Effects of Invention

The interconnected cell porous body of the present invention is manufactured by a simple method of molding a powder prepared by pulverization of a foam. The interconnected cell porous body of the present invention shows water-absorbing efficiency because the micropore walls formed by mutual bonding of the powdery fragments obtained by pulverization of the foam of the resin composition form an interconnected cell structure that is uniform over the entire region of the porous body. In addition, the interconnected cell porous body of the present invention shows relative low stress to compressive deformation and relative low recovery rate after compression. For that reason, the interconnected cell porous body of the present invention can be used as a flower-arrangement holder or a medium for nutriculture of plants very favorably. In addition, the interconnected cell porous body of the present invention, which comprises a biodegradable resin composition containing a polylactic acid resin as a principal component and is degradable in the environment, can be disposed easily after use.

The interconnected cell porous body of the present invention shows higher water-absorbing efficiency when it contains a surfactant and can be used favorably as a flower-arrangement holder or a medium for plants.

It is possible by the method of producing an interconnected cell porous body of the present invention to produce, easily and at high productivity, a large-sized interconnected cell porous body including the powder of a polylactic acid resin, in which the powdery fragments are thermally bonded to each other uniformly.

The water-absorbing material of the present invention, which has an interconnected cell structure and is superior in water absorbing efficiency, can be used favorably as a flower-arrangement holder or a medium for plants. Further, the water-absorbing material of the present invention, which comprises a biodegradable resin composition containing a polylactic acid resin as a principal component and is degradable in the environment, can be disposed easily after use.

DESCRIPTION OF EMBODIMENTS

Figure 1:
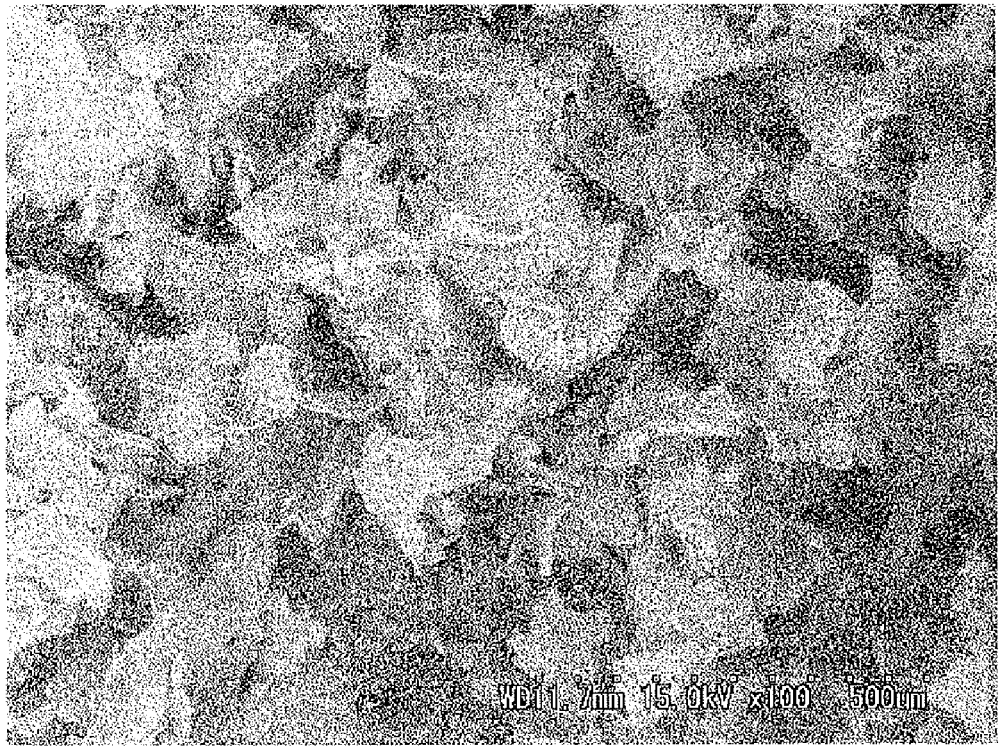
FIG. 1 is a micrograph of the cross section of an interconnected cell porous body obtained by molding a powder obtained by pulverization of a polylactic acid resin foam.

The interconnected cell porous body of the present invention comprises a resin composition containing a polylactic acid resin as its principal component, in which micropore walls formed by mutual binding of the powdery fragments (see FIG. 2), which are obtained by pulverization of the resin composition foam (see FIG. 3), form an interconnected cell structure (see, for example, FIG. 1).

The interconnected cell porous body of the present invention contains, as the base resin, a resin composition containing a polylactic acid resin as its principal component. The polylactic acid resin is a resin containing polylactic acid in an amount of 50 wt % or more. The polylactic acid resin has advantages such as thermoplasticity and relatively favorable processability. In addition, the polylactic acid resin, which shows favorable biodegradability, has an advantage that there is no particular treatment required before disposal after used as a flower-arrangement holder or as an agricultural horticultural material such as a medium for plant nutriculture.

A polylactic acid resin mainly containing a polylactic acid ha ring a lactic acid component isomer ratio of 5% or more, preferably 8% or more, is favorable, because the resin is substantially amorphous and it is possible to easily obtain a low-density foam because of its favorable expandability and moldability.

The polylactic acid resin for use in the present invention is not particularly limited, and a commercially available polylactic acid may be use as it is. For preparation of a lower-density (higher-expansion-ratio) foam, a polylactic acid resin having a melt viscosity increased by addition of a crosslinking agent may be used. In particular, the crosslinking agent for use is preferably an isocyanate compound, which can increase the melt viscosity of polylactic acid efficiently. The polyisocyanate compound may be an aromatic or aliphatic polyisocyanate. Examples of the aromatic polyisocyanates include polyisocyanate compounds having tolylene, diphenylmethane, naphthylene or triphenylmethane as the skeleton. Alternatively, examples of the alicyclic polyisocyanates include polyisocyanate compounds having isophorone or hydrogenated diphenylmethane as the skeleton. Yet alternatively, examples of the aliphatic polyisocyanates include polyisocyanate compounds having hexamethylene or lysine as the skeleton. Although any one of these polyisocyanates may be used, tolylene- or diphenylmethane-based polyisocyanates are used favorably, and diphenylmethane-based polyisocyanates are used particularly favorably from the points of flexibility in use, handleability and others.

In the present invention, a biodegradable resin other than the polylactic acid resin may be also used. Examples of the biodegradable resins include aliphatic polyester resins including hydroxy acid polycondensates such as poly(3-hydroxybutyrate), poly(3-hydroxybutyrate-co-valerate), and poly(3-hydroxybutyrate-co-hexanoate); lactone-based ring-opening polymerization polymers such as polycaprolactone; resins mainly containing a polycondensate from an aliphatic polyvalent alcohol and an aliphatic polyvalent carboxylic acid, such as polybutylene succinate, polybutylene adipate, polybutylene succinate adipate, and poly(butylene adipate/terephthalate), and synthetic polymers such as polyvinylalcohol, polyethylene glycol and polyvinylpyrrolidone; proteins such as gelatin, collagen, zein, and fibroin; cellulose derivatives such as cellulose, acetylcellulose, methylcellulose, hydroxypropylcellulose, chitin, and chitosan. The biodegradable resins may be used alone or in combination of two or more in the polylactic acid resin.

The resin composition for use in the present invention may contain a resin other than biodegradable resin in an amount of less than 10 wt %, if the advantageous effects of the present invention are not hindered. Typical examples thereof include polyethylene resins, polypropylene resins, polystyrene resins, polyamide resins, polyether resins, acrylic resins, vinyl resins, and aromatic polyester resins. These polymers may be used alone or in combination of two or more in the polylactic acid resin.

The melt flow rate of the polylactic acid resin of the present invention is not particularly limited, but it is likely possible to obtain low-density product easily by adjusting the melt flow rate (hereinafter, referred to simply as "MFR") of the polylactic acid resin constituting the foam in the range of 0.001 to 10 g/10 minute.

The MFR of the polylactic acid resin is a value determined in accordance with JIS K7210 at 190° C. and 2.16 kg.

The powder for use in the present invention is powdery fragments of the foam of the resin composition containing the polylactic acid resin as a principal component, which can be obtained by pulverization of the foam. The pulverization of the foam can be carried out easily by using any known technology. Typical favorable examples include methods of using a pulverizer such as jet mill, cutter mill, ball mill, spiral mill, hammer mill, or oscillator. A method of separating only sufficiently pulverized powder by screening the product discharged from the pulverizer may be used in combination. For prevention of thermal fusion of the base resin during pulverization, it is favorably possible to use a method of cooling the foam or the pulverizer.

Figure 2:
FIG. 2 is a micrograph of a powder obtained by pulverization of a polylactic acid resin foam.
Figure 3:
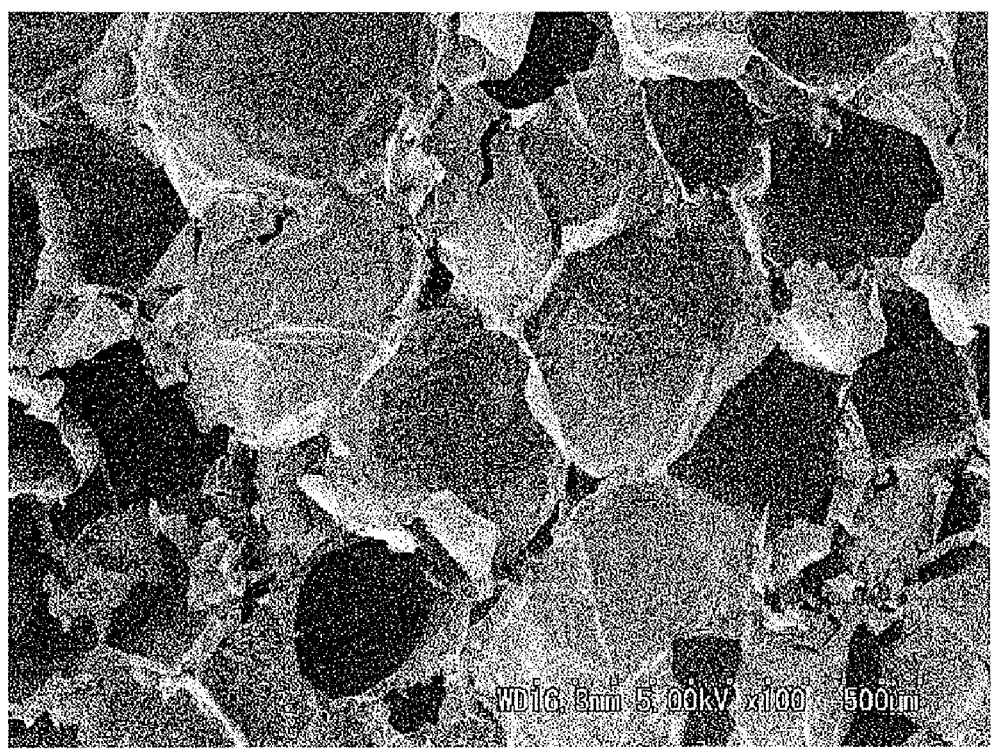
FIG. 3 is a micrograph of the cross section of a polylactic acid resin foam (particles) before pulverization.

The powdery fragments obtained by pulverization of the foam have a fine structure containing flaky regions derived from the cell walls of the original foam (see, for example, FIG. 2). The powder also has low bulk density. It is possible in this way to make the interconnected cell porous body lighter and the internal pore rate larger and thus to make the water absorption per volume significantly larger.

In order to prepare the powder having a fine structure described above, it is preferable to control the average pore diameter of the foam before pulverization (see, for example, FIG. 3) in the range of 100 μm or more and 1,000 μm or less, more preferably 150 μm or more and 700 μm or less. When the average pore diameter of the foam is less than 100 μm, the powder may contain independent pores, leading to reduced water-absorbing efficiency. Alternatively, when it is more than 1,000 μm, the powder may have increased bulk density.

The average diameter of the powder may vary depending on the properties of the desired porous body, but is preferably 100 μm or more and 2,000 μm or less. When the average diameter of the powder is less than 100 μm, the powder may have increased bulk density. Alternatively, when the average diameter of the powder is more than 2,000 μm, the powder may contain independent pores, leading to reduced water-absorbing efficiency. The average diameter, as used in the present invention, means a diameter at an integrated percentage of 50% in the particle size distribution by weight of dry screened particles, as determined by the dry sieving test method specified in JIS K0069. Specifically, the integrated percentage (%) of the particles screened in the test, which is performed by using the standard screens specified in JIS Z8801-1, is plotted against the opening of each screen and the respective points are bonded with a straight line, and the value of the opening at an integration percentage of 50% in the graph is used as the average diameter.

The bulk density of the powder seems to be dependent on the density of the foam supplied to the pulverization processing and the shape of the powder, and generally, lower apparent density of the foam and also larger aspect ratio of the powdery fragments leads to smaller bulk density.

The bulk density of the powder is preferably 0.001 g/cm$^3$ or more and 0.1 g/cm$^3$ or less, more preferably 0.002 g/cm$^3$ or more and 0.05 g/cm$^3$ or less.

The bulk density of the powder is determined in accordance with JIS K6911 and can be calculated from the Formula (1) below.

Bulk density of powder (g/cm$^3$)=[Mass of graduated cylinder containing sample (g)−mass of graduated cylinder (g)]/[Volume of graduated cylinder (cm$^3$)]     (1)

The powder for use in the present invention may be hydrolyzed for adjustment of the hardness. Especially, when the interconnected cell porous body obtained in the present invention is used as a flower-arrangement holder or a medium for plants, the hydrolysis treatment makes the interconnected cell porous body brittler, allowing adjustment of the hardness thereof to a degree suitable for its application.

If the powder is to be hydrolyzed, the hydrolysis is preferably carried out before pulverization. An example of favorable hydrolysis condition is high temperature and high humidity (specifically, a temperature of 40° C. or higher and 140° C. or lower, preferably 60° C. or higher and 100° C. or lower, and a relative humidity of 60% RH more, more preferably 80% RH or more), and the treatment period is generally 3 hours or more and 48 hours or less, although it depends on the kind of the base resin constituting the foam before treatment. For reduction of the hydrolysis period, the hydrolysis may be performed by using an alkali vapor containing a trace amount of alkali components.

The means for performing the hydrolysis treatment is not particularly limited, but it is for example a method of using a batchwise heat-treatment oven having a temperature- and a moisture-conditioning function of controlling the atmosphere in the chamber at a relative humidity by using steam or alkali vapor.

The apparent density of the interconnected cell porous body of the present invention is preferably 0.01 g/cm$^3$ or more and 0.2 g/cm$^3$ or less, more preferably 0.02 g/cm$^3$ or more and 0.1 g/cm$^3$ or less, from the points of light weight, water-absorbing efficiency, and favorable mechanical strength.

The apparent density of the interconnected cell porous body is a value obtained by cutting the porous body into cubes of 3 cm×3 cm×3 cm, weighing one of the cubes, and calculating from the following Formula (2):

Apparent density (g/cm$^3$)=[Weight of cube (g)]/[27 (cm$^3$)]     (2)

The interconnected cell porous body of the present invention shows relative low stress in response to compressive deformation. Specifically, the 10% compressive stress of the interconnected cell porous body of the present invention is 0.02 MPa or more and 0.3 MPa or less, and preferably 0.03 MPa or more and 0.25 MPa or less.

The 10% compressive stress is determined in accordance with JIS K7220.

The interconnected cell porous body of the present invention shows relative low recovery rate after compression. Specifically, the interconnected cell porous body of the present invention has a recovery rate of 95% or less, when it is compressed by 10% and then recovered.

The recovery rate is a value calculated from the thickness of the porous body after the porous body (length 4 cm×width 4 cm×thickness 2.5 cm) is pressed by 10% (to 90% of the original thickness) under load by a press at normal temperature for 1 minutes and, then after removal of the load, recovered as it is left still at normal temperature for 1 day (i.e., post-recovery thickness), in accordance with the following Formula (3):

Recovery rate (%)=[Post-recovery thickness (mm)/ Original thickness (mm)]×100     (3)

The interconnected cell porous body of the present invention can be prepared by bonding powdery fragments obtained by pulverization of the foam to each other. The bonding of powdery fragments means that the powdery fragments are bonded to each other locally. The method of bonding the powdery fragments to each other is not particularly limited but, in a favorable embodiment, the powdery fragments are bonded to each other as they are fused under heat.

A typical production method for the interconnected cell porous body of the present invention includes,
(1) a foam-preparing step of preparing a foam by expanding a resin composition containing a polylactic acid resin as a principal component,
(2) a powder-preparing step of preparing a powder by pulverization of the foam, and
(3) a porous body-preparing step of preparing a porous body having an interconnected cell structure by molding the powder into a particular shape, bonding powdery fragments of the foam to each other, and thus forming micropore walls.

In the step (1), a foam is prepared by using the resin composition described above containing a polylactic acid resin as a principal component. Any known method may be used favorably as the method for preparing the foam. Examples thereof include the extrusion foaming method described in JP-A No. 2005-162804, the bead method described in JP-A No. 2004-149649.

Then in step (2), a powder is prepared by pulverization of the foam. The pulverization method was already described.

Further in step (3), a porous body having an interconnected cell structure is prepared by forming micropore walls by bonding the powdery fragments of the foam to each other. The bonding method is not particularly limited, but bonding by thermal bonding is preferable, and thermal bonding under heat is more preferable.

Typical examples of preparing a porous body by bonding the powdery fragments of the form to each other under heat include a method of placing the powder in a mold, heating the powder at a temperature allowing softening and thermally bonding of the powder but not allowing fusion, and treating the powder at the temperature for a particular time, a method of thermally bonding the powder by feeding the powder gradually onto a hot plate adjusted to a temperature allowing softening and thermal bonding but not allowing fusion of the powder.

The temperature then may vary, for example, depending on the kind of the base resin constituting the powder and the shape and size of the desired porous body but it is preferably 80° C. or higher and 200° C. or lower, in the case where the powder is not heated under an atmosphere containing steam, as will be described below. A temperature of lower than 80° C. may result in insufficient thermal bonding, possibly prohibiting production of a sufficiently solidified interconnected cell porous body. Alternatively, a temperature of higher than 200° C. may result in excessive increase of the density of the porous body, giving an interconnected cell porous body inferior in water-absorbing efficiency.

The heat-treatment period may also vary depending on the kind of the base resin constituting the powder, the shape and size of the desired interconnected cell porous body the treatment temperature, processing method and others, but it is preferably 10 minutes or more and 24 hours or less, if the heat treatment is carried out in an atmosphere containing steam. A heat-treatment period of shorter than 10 minutes may result in insufficient progress of the thermal bonding of the powder, prohibiting production of a sufficiently solidified interconnected cell porous body. For example, when a relatively large porous body for example a block-shaped interconnected cell porous body with a size of 11 cm×23 cm×8 cm, which is a general size for use as a flower-arrangement holder, is prepared, the heat-treatment period may become longer. Alternatively, when the heat-treatment period exceeds 24 hours, the interconnected cell porous body obtained may shrink and have increased density over time.

Further, in the method of thermally bonding the powdery fragments of the foam to each other under heat, it is preferable to perform heating in an atmosphere containing steam at a temperature of 60 to 140° C. and a relative humidity of 20% or more. It is possible by the production method to perform thermal bonding of the powdery fragments to each other efficiently. Although the reasons for the effect is not necessarily clear, it is probably because the steam, which has relative large heat capacity, increases the efficiency of heat transfer to the powder and, as the polylactic acid resin has relative high steam permeability, the steam penetrates into the pores of the powder relatively easily, allowing efficient heating of the internal region of the powder.

The lowest allowable temperature of the atmosphere containing steam is preferably 60° C. or higher, and more preferably 70° C. or higher. When the lowest allowable temperature of the atmosphere containing steam is less than 60° C., the time needed for mutual thermal bonding of the powder may be elongated, resulting in insufficient thermal bonding.

Alternatively, the highest allowable temperature of the atmosphere containing steam is preferably 140° C. or lower, and more preferably 120° C. or lower. When the highest allowable temperature of the atmosphere containing steam is more than 140° C., shrinkage associated with thermal bonding may be amplified.

The most favorable example of the atmosphere containing steam is an atmosphere of a mixture of steam and air at a particular temperature under normal pressure. An atmosphere only of steam at a particular temperature under normal pressure may also be favorably in the present invention. For adjustment of the atmosphere temperature, an atmosphere of a mixture of steam and air or only of steam at a particular temperature under increased pressure or under reduced pressure can also be used favorably. When pressurized atmosphere is used, the pressure may be determined properly depending on the desired temperature and steam/air ratio, but it is normally in the range from normal pressure to 0.3 MPa as absolute pressure, and when reduced-pressure atmosphere is used, the pressure is normally in the range from 0.04 MPa to normal pressure as absolute pressure.

The atmosphere containing steam above may contain a vapor component other than steam and air in a small amount for acceleration of the thermal bonding of the powder, and typical examples thereof include lower alcohols such as methanol and ethanol; lower ethers such as dimethylether and diethylether; and lower ketones such as acetone and methylethylketone. Normally, the content of the vapor component other than steam and air is 10% or less by weight.

The specific method of achieving the atmosphere containing steam above is not particularly limited, and a typical example that is favorable from the viewpoint of powder molding is a method of using a batchwise heat-treatment oven having a temperature- and humidity-controlling function. Another favorable typical example is a method of preparing a particular atmosphere in a continuous oven having a function of transporting the powder by blowing a mixture of steam and air into the oven. In such a case, a method of controlling the condition of the atmosphere in the oven for example by adjusting the amount of the mixture blown in, in accordance with the observed temperature of the oven is also used favorably.

Particularly preferably, among the atmospheres containing steam for use in the present invention described above, the atmosphere is substantially at normal pressure and has a relative humidity of 60 to 100% for easier preservation of the atmospheric condition. When the atmosphere's relative humidity is less than 60%, the treatment period needed for mutual thermal bonding of the powdery fragments obtained by pulverization of the foam may be elongated.

The condition of the atmosphere containing steam needed for the heat treatment of the present invention has been described. The period of the heat treatment may vary significantly depending on the kind of the base substrate used, the condition of the atmosphere, and the size of the desired interconnected cell porous body and can be determined properly, but it is approximately 2 minutes to 3 hours. For example, the treatment period needed for folding a block-shaped interconnected cell porous body having a size of 11 cm×23 cm×8 cm, which is a general size for flower-arrangement holders, is in the range from approximately 2 to 40 minutes.

A specific method of producing an interconnected cell porous body preferably used is, for example, a method of placing a powder or a mixture of a powder and any other components described below in a mold having a desired size and heat-treating it, as it is placed in the mold. The shape of the mold then is not particularly limited, but it is preferable that the mold has an opening allowing penetration of steam at least in part of it, because steam can penetrate into the powder more efficiently. Specifically, a mold having an opening on the top face or a mold having many small holes permitting sufficient flow of steam may be used.

Although the method of filling the powder in a mold and the filling state of the powder are not particularly limited in the present invention, the filling density of the powder during molding is preferably uniform so that the resulting molding has a uniform density over the entire region. Thus for that purpose, a method of packing the powder partially or entirely in a mold and tapping the mold or a method of packing the powder partially or entirely in a mold and vibrating the mold for uniformization of the filling density is used favorably in the present invention.

Another typical favorable method of molding an interconnected cell porous body is a method of preparing a preliminary molding by molding a powder or a mixture of a powder and any other components described below, either in a mold or continuously under slight compression, and heat-treating the preliminary molding.

Thus, it is possible by the production method of the present invention to obtain an interconnected cell porous body and mold it into a shape suitable for its application, such as block or sheet.

The interconnected cell porous body of the present invention may contain various additives as additional components, if the advantageous effects of the present invention are not hindered. Typical examples of the additives include surfactants; pigments; dyes; inorganic materials such as talc, calcium carbonate, borax, zinc borate, aluminum hydroxide, and calcium stearate; flame retardants; antistatic agents; weathering agents; fillers; anti-fogging agents; antibacterial agents; lubricants; nutrients and the like. These additives can be added, for example, by mixing with the powder during heated molding or by mixing previously with the base resin constituting the powder.

In the present invention, especially when the interconnected cell porous body is used in applications demanding water absorption such as a flower-arrangement holder and a medium for plants, addition of a surfactant is effective for expression of more favorable water-absorbing efficiency.

The content of the surfactant in the present invention is 0.1 wt % or more and 30 wt % or less, and preferably 2 wt % or more and 20 wt % or less, with respect to 100 wt % of the total weight of the interconnected cell porous body. A surfactant content of less than 0.1 wt % may not be effective to make the interconnected cell porous body show improved water-absorbing efficiency, while a surfactant content of more than 30 wt % may lead to reduction of the strength of the porous body after water absorption.

Any one of anionic, cationic, amphoteric, and nonionic surfactants may be used favorably as the surfactant for use in the present invention, but an anionic or nonionic surfactant is preferable, from the points of relative stability and cost.

Typical examples of the surfactants favorably used in the present invention include anionic surfactants such as fatty acid sodium salts, fatty acid potassium salts, sodium alkylbenzenesulfonates, potassium alkylbenzenesulfonates, sodium higher alcohol sulfates, potassium higher alcohol sulfates, alkylether sulfate ester sodium salts, alkylether sulfate ester potassium salts, α-sulfofatty acid esters, sodium α-olefinsulfonates, potassium α-olefinsulfonates, sodium monoalkylsulfates, potassium monoalkylsulfates, and sodium monoalkylphosphates; cationic surfactants such as alkyltrimethylammonium chlorides, dialkyldimethylammonium chlorides, and alkylbenzyldimethylammonium chloride; amphoteric surfactants such as alkylcarboxybetaines; nonionic surfactants such as polyoxyethylene alkylethers, polyoxyethylene alkylphenol ethers, alkyl glucosides, polyoxyethylene fatty acid esters, sucrose fatty acid esters, sorbitan fatty acid esters, polyoxyethylene sorbitan fatty acid esters, fatty acid diethanolamides, and alkyl monoglyceryl ethers; and the like. These surfactants may be used alone or in combination of two or more.

The method of adding the surfactant is not particularly limited, but typical favorable examples thereof include a method of mixing a surfactant with the powder and making the powder bonded to each other before preparation of the interconnected cell porous body, a method of mixing a surfactant previously with the base resin constituting the powder.

The rate of interconnected cells in the interconnected cell porous body of the present invention is preferably 60% or more and less than 100%, more preferably 80% or more and less than 100%. When the interconnected-cell rate is less than 60%, the interconnected cell porous body may not have sufficient water-absorbing property, a characteristic property thereof.

The water absorption (water absorbed by 1 g of porous body) by the interconnected cell porous body of the present invention is preferably 5 to 100 g/g, and more preferably 10 to 100 g/g. When the water absorption less than 5 g/g, the porous body may show performance insufficient for use as a flower-arrangement holder or a medium for plants.

It is easy to make the interconnected cell porous body of the present invention lower in density and have uniform interconnected cells and thus to make the porous body have a structure allowing expression of favorable liquid-absorbing efficiency (see, for example, FIG. 1). It is also possible, by adding a particular amount of a surfactant to the interconnected cell porous body having the structure described above, to make the resulting porous body show extremely favorable water-absorbing efficiency. Therefore, the interconnected cell porous body of the present invention can be used as a water-absorbing material.

The water-absorbing material above is a material that permits penetration of water therein when in contact with water under normal temperature and pressure, and holds the water in the state after water has penetrated. The water-absorbing material of the present invention is a material characteristic in that it absorbs water on the basis of physical phenomenon such as so-called capillary phenomenon, thus has favorably weak water-holding power after water absorption and can release the water for example in response to absorption of water by the root of plant. Specifically, it can be applied for example as a flower-arrangement holder, a medium for plants, a soil conditioner and can be used favorably in these fields.

EXAMPLES

Hereinafter, the present invention will be described in more detail with reference to typical examples, but it should be understood that the present invention is not limited to these examples.

The apparent density, 10% compressive stress, recovery rate, interconnected-cell rate, water absorption, liquid-absorbing rate, internal thermal bonding state of the porous body obtained in each of the Examples and the Comparative Example were evaluated in accordance with the following criteria.

(Apparent Density)

A porous body obtained was cut into cubes of 3 cm×3 cm×3 cm, the weight of it was measured and the apparent density thereof was calculated from the following Formula (2):

$$\text{Apparent density (g/cm}^3\text{)} = [\text{Weight of cube (g)}]/[27\ (\text{cm}^3)] \quad (2)$$

(10% Compressive Stress)

The 10% compressive stress was determined in accordance with JIS K7220.

(Recovery Rate)

A porous body (length 4 cm×width 4 cm×thickness 2.5 cm) was kept compressed by 10% (to 90% of original thickness) for 1 minute under load of a press at normal temperature. After removal of the load, it was left still at normal temperature for 1 day, and the thickness of the porous body (i.e., thickness after recovery) was determined. The recovery rate was calculated from the following Formula (3):

$$\text{Recovery rate (\%)} = [\text{Thickness after recovery (mm)}/\text{Original thickness (mm)}] \times 100 \quad (3)$$

(Interconnected-Cell Rate)

A porous body obtained was cut into samples of 1 cm×1 cm×1 cm and the volume of the foam was measured by using an air pycnometer (air-comparative hydrometer Type 1000, manufactured by TOKYO SCIENCE CO., LTD.) The interconnected-cell rate was calculated from the following Formula (4):

$$\text{Interconnected-cell rate (\%)} = \{1 - [\text{Volume of foam, as determined by using air pycnometer (cm}^3)/1\ (\text{cm}^3)]\} \times 100 \quad (4)$$

(Water Absorption)

A porous body obtained was cut into cubes of 3 cm×3 cm×3 cm; tap water was placed in a 1 L beaker to a depth of 10 cm; and, after stabilization of the liquid surface, the cube obtained was placed still on the liquid surface with its bottom face in contact with water. The cube of the porous body sediments gradually by absorbing the aqueous solution; the cube was withdrawn 5 minutes after its placement on the liquid surface, and the water absorption was determined from the weight change of the cube between before and after water absorption; and calculated from the following Formula (5);

$$\text{Water absorption (g/g)} = [\text{Water absorbed (g)}]/[\text{Weight of cube before water absorption (g)}] \quad (5)$$

(Liquid-Absorbing Rate)

A porous body obtained was cut into cubes of 5 cm×5 cm×5 cm and the weight of the cube was determined. Aqueous 1 wt % sodium α-olefinsulfonate solution was placed in a 1 L beaker to a depth of 10 cm; and, after stabilization of the liquid surface, the cube obtained was placed still on the liquid surface with its bottom face in contact with the solution. The cube of the porous body sediments gradually by absorbing the aqueous solution; and the time needed for the top face of the cube to reach the liquid surface was determined by visual observation.

The cube immediately after immersion was withdrawn; the liquid absorbed was determined from the weight change of the cube between before and after liquid absorption; and the liquid absorption was calculated from the following Formula (6):

Liquid absorption (g/g)=[Liquid absorbed (g)]/ [Weight of cube before liquid absorption (g)]   (6)

When the top face of the cube did not reach the liquid surface by sedimentation, the test was terminated after 10 minutes and the liquid absorption was calculated from the Formula (6).

(Internal Thermal Bonding State)

A porous body obtained was cut with a cutter knife in the direction perpendicular to the longest side (crosswise direction) and along the face at the central position of the longest side, and the thermal bonding state of the powder in the central region of the cut surface was evaluated in accordance with the following criteria.

A: Thermal bonding is sufficient and the porous body retains its shape when it is pressed with finger.

B: Thermal bonding is insufficient and the porous body retains its shape when it is pressed with finger, although there is some powder exfoliated.

C: There is no thermal bonding and the porous body does not retain its shape when it is pressed with finger, as the powder is exfoliated.

Example 1

[Preparation of Expanded Particles]

100 wt parts of a polylactic acid resin having a D isomer rate of 10% and a melt flow rate of 3.7 g/10 minute and 2.0 wt parts of a polyisocyanate compound (MR-200, manufactured by NIPPON POLYURETHANE INDUSTRY CO., LTD.) were melt-extruded in a biaxial extruder (TEM35B, manufactured by TOSHIBA MACHINE CO., LTD.) at a cylinder temperature of 185° C. and cut in water by using a underwater cutter, to give bead-shaped polylactic acid resin particles of approximately 1 mmφ (approximately 1.5 mg).

100 wt parts of the polylactic acid resin particle obtained, 100 wt parts of water, 12 wt parts of deodorized butane (n-butane/isobutane, weight ratio: 7/3) as an expanding agent, 10 wt parts of sodium chloride, and 0.3 wt part of polyoxyethylene oleylether as a dispersion aid were placed in an autoclave and held at 84° C. for 90 minutes. The mixture was cooled sufficiently and then withdrawn and dried, to give polylactic acid resin expandable particles. The polylactic acid resin expandable particles obtained had an expanding agent content of 5.5%.

The polylactic acid resin expandable particles obtained were supplied into a preliminary foaming machine (BHP300, manufactured by DAISEN CO., LTD.) and held under a vapor at 90° C. for 40 to 60 seconds, to give expanded polylactic acid resin particles. The expanded polylactic acid resin particles obtained were dried in air, and thermal bonding particles were fractionated by using screens. The expanded polylactic acid resin particles thus fractionated had a bulk density of 0.025 g/cm$^3$ and an average pore diameter of 500 µm.

[Preparation of Powder]

The expanded particles obtained was pulverized in a cutter mill and filtered through a screen having an opening of 800 µm, to give a powder. The powder had a bulk density of 0.031 g/cm$^3$.

[Preparation of Interconnected Cell Porous Body]

10 wt parts of sodium α-olefinsulfonate powder (LIPOLAN (registered trademark) PJ-400, manufactured by LION CORPORATION) as a surfactant was added to 100 wt parts of the powder obtained and the mixture was mixed thoroughly. The mixture was placed in an aluminum mold (internal size: 5 cm×5 cm×5 cm) and heat-treated in a hot air drier at 120° C. for 10 hours, to give an interconnected cell porous body.

Example 2

An interconnected cell porous body was prepared in a manner similar to Example 1, except that the amount of the sodium α-olefinsulfonate powder (LIPOLAN PJ-400), manufactured by LION CORPORATION) used in Example 1 was changed from 10 wt parts to 2 wt parts.

Example 3

An interconnected cell porous body was prepared in a manner similar to Example 1, except that the amount of the sodium α-olefinsulfonate powder (LIPOLAN PJ-400, manufactured by LION CORPORATION) used in Example 1 was changed from 10 parts to 25 wt parts.

Example 4

An interconnected cell porous body was prepared in a manner similar to Example 1, except that the amount of the sodium α-olefinsulfonate powder (LIPOLAN PJ-400, manufactured by LION CORPORATION) used in Example 1 was changed from 10 wt parts to 0.2 wt part.

Example 5

An interconnected cell porous body was prepared in a manner similar to Example 1, except that the sodium α-olefinsulfonate powder (LIPOLAN PJ-400, manufactured by LION CORPORATION) used in Example 1 was not used.

Example 6

[Preparation of Expanded Particles]

Polylactic acid resin expandable particles were obtained in a manner similar to Example 1, except that the amount of deodorized butane as a expanding agent used in Example 1 was changed from 12 wt parts to 4 wt parts. The polylactic acid resin expandable particles obtained had an expanding agent content of 2.5%. The particles were treated in a manner similar to Example 1, to give expanded polylactic acid resin particles. The expanded polylactic acid resin particles obtained were dried in air; the thermal bonding particles were fractionated by using screens; and the fractionated expanded polylactic acid resin particles had a bulk density of 0.08 g/cm$^3$ and an average pore diameter of 300 µm.

[Preparation of Powder]

The expanded particles obtained were pulverized in a cutter mill and filtered through a screen having an opening of 800 μm, to give a powder. The powder had a bulk density of 0.06 g/cm³.

[Preparation of Interconnected Cell Porous Body]

10 wt parts of α-olefinsulfonate powder (LIPOLAN PJ-400, manufactured by LION CORPORATION) as a surfactant sodium was added to 100 wt parts of the powder obtained and the mixture was mixed thoroughly. The mixture was placed in an aluminum mold (internal size: 5 cm×5 cm×5 cm) and heat-treated in a hot air drier at 120° C. for 10 hours, to give an interconnected cell porous body.

Example 7

[Preparation of Powder]

The expanded polylactic acid resin particles obtained in Example 1 was left still for hydrolysis in a thermohygrostat (programmed temperature/humidity-controlled machine HPAV-120-40, manufactured by ISUZU SEISAKUSHO CO., LTD.) at a temperature of 80° C. and a relative humidity of 95% for 15 hours. The expanded particles were pulverized in a cutter mill and filtered through a screen having an opening of 800 μm, to give a powder. The powder had a bulk density of 0.033 g/cm³.

[Preparation of Interconnected Cell Porous Body]

10 wt parts of sodium α-olefinsulfonate powder (LIPOLAN PJ-400, manufactured by LION CORPORATION) as a surfactant was added to 100 wt parts of the powder obtained and the mixture was mixed thoroughly. The mixture was placed in an aluminum mold (internal size: 5 cm×5 cm×5 cm) and heat-treated in a hot air drier at 120° C. for 10 hours, to give an interconnected cell porous body.

The interconnected cell porous body after the hydrolysis treatment showed favorable brittleness and allowed smooth insertion of flowers and thus showed properties favorable for use as a flower-arrangement holder.

Comparative Example 1

Polylactic acid resin expandable particles were obtained in a manner similar to Example 1, except that the amount of deodorized butane as a expanding agent used in Example 1 was changed from 12 wt parts to 2 wt parts. The polylactic acid resin expandable particles obtained had an expanding agent content of 1.0%. The particles were treated in a manner similar to Example 1, to give expanded polylactic acid resin particles. The expanded polylactic acid resin particles obtained were dried in air; the thermal bonding particles were fractionated by using screens; and the fractionated expanded polylactic acid resin particles had a bulk density of 0.29 g/cm³ and an average pore diameter of 100 μm.

Subsequently the expanded particles obtained were pulverized in a cutter mill and filtered through a screen having an opening of 800 μm, to give a powder. The powder obtained had a bulk density of 0.28 g/cm³. 10 wt parts of sodium α-olefinsulfonate powder (LIPOLAN PJ-400, manufactured by LION CORPORATION) as a surfactant was added to 100 wt parts of the powder obtained and the mixture was mixed thoroughly. The mixture was placed in an aluminum mold (internal size: 5 cm×5 cm×5 cm) and heat-treated in a hot air drier at 120° C. for 10 hours, to give an interconnected cell porous body.

Comparative Example 2

An in-mold foamed molding was prepared by using the polylactic acid-based expanded particles obtained Example 1 under the following condition. Specifically, a mold of 300× 400×25 mm in size was installed in a foaming machine (BHP-300, manufactured by DAISEN CO., LTD.), and the polylactic acid-based expanded particles were filled therein at a compressibility of 0% and treated at a steam pressure of 0.1 MPa(G) for 10 to 20 seconds, to give a in-mold foamed polylactic acid resin molding.

The in-mold foamed molding obtained was hydrolyzed under the condition of a temperature of 80° C. and a relative humidity of 100% for 12 hours and additionally pressurized under a nitrogen pressure of 0.3 MPa for 4 hours, to give an interconnected cell porous body.

Comparative Example 3

An in-mold foamed polylactic acid resin molding obtained in a manner similar to Comparative Example 2 was roughly pulverized in a coarse pulverizer (Quick Mill, screen: 8 mmφ, manufactured by SEISHIN ENTERPRISE CO., LTD.), to give a powder having an average external diameter of 5.6 mm and a bulk density of 0.038 g/cm³. The powder obtained was placed in an aluminum mold (internal size: 5 cm×5 cm×5 cm) and heat-treated in a hot air drier at 120° C. for 10 hours, to give a molding.

Evaluation results for the porous bodies (moldings) obtained in Examples 1 to 7 and Comparative Examples 1 to 3 are summarized in Table 1.

TABLE 1

| | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Powder bulk density (g/cm³) | | 0.031 | 0.031 | 0.031 | 0.031 | 0.031 | 0.06 | 0.033 | 0.28 | — | 0.038 |
| Amount of surfactant in 100 wt parts of powder (wt part) | | 10 | 2 | 25 | 0.2 | 0 | 10 | 10 | 10 | 0 | 0 |
| Porous body | Apparent density (g/cm³) | 0.039 | 0.041 | 0.068 | 0.04 | 0.033 | 0.11 | 0.038 | 0.33 | 0.023 | 0.047 |
| | 10% Compressive stress (MPa) | 0.14 | 0.15 | 0.12 | 0.15 | 0.15 | 0.17 | 0.03 | 1.2 | — | 0.26 |
| | Recovery rate (%) | 91.3 | 91.5 | 91.1 | 91.4 | 91.5 | 92.1 | 90.1 | 96.6 | — | 95.6 |
| | Interconnected-cell rate (%) | 98 | 99 | 99 | 99 | 98 | 97 | 99 | 87 | 96 | 41 |
| | Water absorption (g/g) | 25 | 23 | 13 | 23 | 0.15 | 8.3 | 25 | 2.5 | 0.10 | 0.06 |

TABLE 1-continued

|  |  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Liquid-absorbing rate | Period | — | — | — | — | 36 sec | — | — | — | 10 min* | — |
|  | Liquid absorption (g/g) | — | — | — | — | 28.8 | — | — | — | 0.12 | — |

*Water was not completely absorbed

The results shown in Table 1 indicate that porous bodies obtained in Examples having low density and high interconnected-cell rate and interconnected-cell porous bodies additionally containing a surfactant show high water absorption. As shown in Example 7, it was confirmed that interconnected-cell porous bodies containing the powder obtained from a hydrolyzed foam can be used favorably as a flower-arrangement holder.

On the other hand, the high-density porous body of Comparative Example 1 has high recovery rate after compressed and shows low water absorption. In addition, the molding of Comparative Example 2 obtained by hydrolysis and pressurization of a molding of conventional expanded polylactic acid resin particles has high interconnected-cell rate, but the pore structure is resistant to penetration of liquid and the liquid absorption thereof is unsatisfactory. In the case of the molding of Comparative Example 3, the powder is insufficiently fine and the particles of the powder after pulverization still contain independent pores that were originally present in the foam before pulverization. For that reason, the molding of Comparative Example 3 has low interconnected-cell rate and the liquid absorption thereof is unsatisfactory.

Example 8

[Preparation of Expanded Particles and Powder]
A powder having a bulk density of 0.031 g/cm³ was prepared in a manner similar to Example 1.
[Preparation of Interconnected Cell Porous Body]
3 wt parts of sodium α-olefinsulfonate powder (LIPOLAN PJ-400, manufactured by LION CORPORATION) as a surfactant was added to 100 wt parts of the powder obtained and the mixture was mixed thoroughly. The mixture obtained was placed in a rectangular paper mold (internal size: length 11 cm×width 23 cm×height 8 cm) with open top face, as it is filled therein. The mold containing the mixture was placed in a batchwise heat-treatment oven having temperature- and humidity-controlling functions (programmed temperature/humidity-controlled machine HPAV-120-40, manufactured by ISUZU SEISAKUSHO CO., LTD.) and heat-treated in the heat-treatment oven described above under an atmosphere of normal pressure, 90° C. and 95% RH, which was achieved by controlling the temperature in the oven constant and keeping the humidity therein constant by supplying a desirable amount of steam into the oven as needed, for 10 minutes, to give an interconnected cell porous body.

Example 9

An interconnected cell porous body was prepared in a manner similar to Example 8, except that the heat treatment atmosphere used in the [Preparation of interconnected cell porous body] was changed to normal pressure, 90° C. and 70% RH.

Example 10

An interconnected cell porous body was prepared in a manner similar to Example 8, except that the heat treatment atmosphere used in the [Preparation of interconnected cell porous body] was changed to normal pressure, 70° C. and 70% RH.

Example 11

[Preparation of Expanded Particles and Powder]
A powder having a bulk density of 0.06 g/cm³ was prepared in a manner similar to Example 6.
[Preparation of Interconnected Cell Porous Body]
3 wt parts of sodium α-olefinsulfonate powder (LIPOLAN PJ-400, manufactured by LION CORPORATION) as a surfactant was added to 100 wt parts of the powder obtained and the mixture was mixed thoroughly. The mixture obtained was placed in a rectangular paper mold (internal size: length 11 cm×width 23 cm×height 8 cm) with open top face, as it is filled therein. The mold containing the mixture was placed in a batchwise heat-treatment oven having temperature- and humidity-controlling functions (programmed temperature/humidity-controlled machine HPAV-120-40, manufactured by ISUZU SEISAKUSHO CO., LTD.) and heat-treated in the heat-treatment oven described above under an atmosphere of normal pressure, 90° C. and 95% RH for 10 minutes, to give an interconnected cell porous body.

Example 12

An interconnected cell porous body was prepared in a manner similar to Example 8, except that the heat treatment atmosphere used in the [Preparation of interconnected cell porous body] was changed to normal pressure, 90° C. and 50% RH.

Example 13

[Preparation of Expanded Particle]
The expanded polylactic acid resin particles obtained in Example 1 were left still for 18 hours for hydrolysis in a batchwise heat-treatment oven having temperature- and humidity-controlling functions (programmed temperature/humidity-controlled machine HPAV-120-40, manufactured by ISUZU SEISAKUSHO CO., LTD.) adjusted to a temperature of 80° C. and a relative humidity of 95%.
[Preparation of Powder]
The expanded particles obtained were pulverized in a cutter mill and filtered through a screen having an opening of 800 μm, to give a powder. The powder had a bulk density of 0.041 g/cm³.
[Preparation of Interconnected Cell Porous Body]
3 wt parts of sodium α-olefinsulfonate powder (LIPOLAN PJ-400, manufactured by LION CORPORATION) as a surfactant was added to 100 wt parts of the powder obtained and the mixture was mixed thoroughly. The mixture obtained was placed in a rectangular paper mold (internal size: length 11 cm×width 23 cm×height 8 cm) with open top face, as it is filled therein. The mold containing the mixture was placed in a batchwise heat-treatment oven having temperature- and humidity-controlling functions (programmed temperature/humidity-controlled machine HPAV-120-40, manufactured by ISUZU SEISAKUSHO CO., LTD.) and heat-treated in the heat-treatment oven described above under an atmosphere of normal pressure, 90° C. and 95% RH for 10 minutes, to give an interconnected cell porous body.

Evaluation results for the interconnected-cell porous bodies obtained in Examples 8 to 13 above are summarized in Table 2.

sphere was change to normal pressure and 120° C. (without moisture control) and the treatment period to 24 hours.

Comparative Example 6

An interconnected cell porous body was prepared in a manner similar to Example 8, except that the heat treatment atmosphere used in the [Preparation of interconnected cell porous body] was changed to normal pressure, 90° C. and

TABLE 2

|  |  | Example 8 | Example 9 | Example 10 | Example 11 | Example 12 | Example 13 |
|---|---|---|---|---|---|---|---|
| Powder | Bulk density (g/cm³) | 0.031 | 0.031 | 0.031 | 0.06 | 0.031 | 0.041 |
|  | Hydrolysis treatment | no | no | no | no | no | yes |
| Heat-treatment atmosphere | Temperature (° C.) | 90 | 90 | 70 | 90 | 90 | 90 |
|  | Relative humidity (RH %) | 95 | 70 | 70 | 95 | 50 | 95 |
| Heat-treatment period |  | 10 min | 10 min | 10 min | 10 min | 10 min | 10 min |
| Porous body | Internal thermal bonding state | A | A | A | A | B | A |
|  | Apparent density (g/cm³) | 0.037 | 0.035 | 0.034 | 0.052 | 0.038 | 0.038 |
|  | 10% Compressive stress (MPa) | 0.15 | 0.14 | 0.14 | 0.16 | 0.12 | 0.03 |
|  | Recovery rate (%) | 91.4 | 91.2 | 91.1 | 91.4 | 91.8 | 90.2 |
|  | Interconnected-cell rate (%) | 98 | 99 | 99 | 96 | 98 | 99 |
|  | Water absorption (g/g) | 26 | 26 | 26 | 14 | 25 | 18 |

Comparative Example 4

An interconnected cell porous body was prepared in a manner similar to Example 8, except that the heat treatment atmosphere used in the [Preparation of interconnected cell porous body] was changed to normal pressure, 50° C. and 95% RH, but only unsuccessfully. No internally thermal-bonded interconnected-cell body was obtained and thus no evaluation was made.

Comparative Example 5

An interconnected cell porous body was prepared in a manner similar to Example 8, except that the heat treatment machine used in the [Preparation of interconnected cell porous body] was changed to a hot air drier (forced-convection constant-temperature drier, SOFW-600, manufactured by AS ONE CORPORATION) and the heat treatment atmosphere was changed to normal pressure and 120° C. (without moisture control), but only unsuccessfully. No internally thermal-bonded interconnected-cell body was obtained and thus, no evaluation was made.

Example 14

An interconnected cell porous body was prepared in a manner similar to Example 8, except that the heat treatment machine used in the [Preparation of interconnected cell porous body] was changed to a hot air drier (forced-convection constant-temperature drier, SOFW-600, manufactured by AS ONE CORPORATION) and the heat treatment atmo- 15% RH, but only unsuccessfully. No internally thermal-bonded interconnected-cell body was obtained and thus no evaluation was made.

Reference Example 1

An interconnected cell porous body was prepared in a manner similar to Example 8, except that the heat treatment atmosphere used in the [Preparation of interconnected cell porous body] was changed to normal pressure, 50° C. and 95% RH and the paper mold was changed to a rectangular paper mold (internal size: length 5 cm×width 5 cm×height 2 cm) with open top face.

Reference Example 2

An interconnected cell porous body was prepared in a manner similar to Example 8, except that the heat treatment machine used in the [Preparation of interconnected cell porous body] was changed to a hot air drier (forced-convection constant-temperature drier, SOFW 600, manufactured by AS ONE CORPORATION) and the heat treatment atmosphere was changed to normal pressure and 120° C. (without moisture control) and the paper mold to rectangular paper mold (internal size: length 5 cm×width 5 cm×height 2 cm) with open top face.

Evaluation results for the moldings (porous bodies) obtained in Comparative Examples 4 to 6, Example 14, and Reference Examples 1 and 2 are summarized in Table 3.

TABLE 3

|  |  | Comparative Example 4 | Comparative Example 5 | Example 14 | Comparative Example 6 | Reference Example 1 | Reference Example 2 |
|---|---|---|---|---|---|---|---|
| Powder | Bulk density (g/cm³) | 0.031 | 0.031 | 0.031 | 0.031 | 0.031 | 0.031 |
|  | Hydrolysis treatment | no | no | no | no | no | no |
| Heat-treatment atmosphere | Temperature (° C.) | 50 | 120 | 120 | 90 | 50 | 120 |
|  | Relative humidity (RH %) | 95 | Without moisture control | Without moisture control | 15 | 95 | Without moisture control |

TABLE 3-continued

| | | Comparative Example 4 | Comparative Example 5 | Example 14 | Comparative Example 6 | Reference Example 1 | Reference Example 2 |
|---|---|---|---|---|---|---|---|
| Heat-treatment period | | 10 min | 10 min | 24 hr | 10 min | 10 min | 10 min |
| Porous body | Internal thermal bonding state | C | C | A | C | A | A |
| | Apparent density (g/cm$^3$) | — | — | 0.041 | — | 0.039 | 0.051 |
| | 10% Compressive stress (MPa) | — | — | 0.26 | — | — | — |
| | Recovery rate (%) | — | — | 92.2 | — | — | — |
| | Interconnected-cell rate (%) | — | — | 98 | — | 95 | 97 |
| | Water absorption (g/g) | — | — | 25 | — | 22 | 18 |

It was not possible to prepare an internally thermal-bonded interconnected-cell body in Comparative Examples 4, 5, and 7 and thus no evaluation was made.

As obvious from the results shown in Tables 2 and 3, it is possible under the production condition of the present invention, in particular under the production condition of heating the foam-pulverized powder under an atmosphere containing steam at a temperature of 60 to 140° C. and a relative humidity of 20% or more, to obtain an interconnected cell porous body in a favorable thermally bonded state even inside, because thermal bonding of the power progresses in a shorter time even when a relatively large mold is used. In contrast, in Comparative Example 4 where the heating temperature is lower, no sufficient thermally bonded state is obtained when a relatively large mold is used. In addition, the results of Comparative Examples 5 and 6 and Example 14 show that it is not possible when a relative large mold is used to obtain a sufficient thermal-bonded state under relative low humidity condition or it takes a very long period for obtaining a sufficient thermal-bonded state. As obvious from Reference Examples 1 and 2, when a relatively small mold is used, a favorable interconnected cell porous body in a favorable thermal bonding state even inside can be obtained, even if the temperature and the relative humidity are lower.

As shown in Examples, interconnected cell porous bodies containing a surfactant show favorable water-absorbing efficiency that is required for use as a flower-arrangement holder or a medium for plants.

INDUSTRIAL APPLICABILITY

The interconnected cell porous body and the water-absorbing material of the present invention can be used favorably as a flower-arrangement holder or a medium for nutriculture of plants. In addition, the interconnected cell porous body and the water-absorbing material of the present invention, which contains a biodegradable resin composition as a principal component, demands no special treatment during disposal after use and can be post-processed easily.

The invention claimed is:

1. An interconnected cell porous body, comprising a resin composition containing a polylactic acid resin as a principal component, wherein:
    the micropore walls formed by mutual bonding of powdery fragments obtained by pulverization of a foam of the resin composition form an interconnected cell structure of the porous body;
    the apparent density of the interconnected cell porous body is 0.01 g/cm$^3$ or more and 0.2 g/cm$^3$ or less;
    the 10% compressive stress of the interconnected cell porous body is 0.02 MPa or more and 0.3 MPa or less; and
    the compression recovery rate of the interconnected cell porous body is 95% or less.

2. The interconnected cell porous body according to claim 1, wherein the powdery fragments are bonded to each other by thermal bonding.

3. The interconnected cell porous body according to claim 1, wherein the powder has a bulk density of 0.001 g/cm$^3$ or more and 0.1 g/cm$^3$ or less.

4. The interconnected cell porous body according to claim 1, wherein the powder has an average diameter of 100 μm or more and 2,000 μm or less.

5. The interconnected cell porous body according to claim 1, wherein the foam of the resin composition is hydrolyzed.

6. The interconnected cell porous body according to claim 1, comprising a surfactant.

7. A method of producing an interconnected cell porous body comprising a resin composition containing a polylactic acid resin as a principal component, wherein
    the porous body has an apparent density of 0.01 g/cm$^3$ or more and 0.2 g/cm$^3$ or less, a 10% compressive stress of 0.02 MPa or more and 0.3 MPa or less, and a compression recovery rate of 95% or less,
    comprising steps (1) to (3):
    (1) a foam-preparing step of preparing a foam by expanding a resin composition containing a polylactic acid resin as a principal component,
    (2) a powder-preparing step of preparing a powder by pulverization of the foam, and
    (3) a porous body-preparing step of preparing a porous body having an interconnected cell structure by molding the powder into a particular shape, bonding powdery fragments of the foam to each other and thus forming micropore walls.

8. The method of producing an interconnected cell porous body according to claim 7, wherein the powdery fragments are bonded to each other by thermal bonding.

9. The method of producing an interconnected cell porous body according to claim 7, wherein the thermal bonding is performed by heating.

10. The method of producing an interconnected cell porous body according to claim 7, wherein the heating is performed under an atmosphere containing steam at a temperature of 60 to 140° C. and a relative humidity of 20% or more.

11. The method of producing an interconnected cell porous body according to claim 7, wherein the heating is performed under an atmosphere at a relative humidity of 60 to 100%.

12. The method of producing an interconnected cell porous body according to claim 7, wherein the powder has a bulk density of 0.001 g/cm$^3$ or more and 0.1 g/cm$^3$ or less.

13. The method of producing an interconnected cell porous body according to claim 7, wherein the powder has an average diameter of 100 μm or more and 2,000 μm or less.

14. The method of producing an interconnected cell porous body according to claim 7, wherein the foam is hydrolyzed after the foam-preparing step and before the powder-preparing step.

15. The method of producing an interconnected cell porous body according to claim 7, wherein the interconnected cell porous body contains a surfactant that is added in the foam-preparing step or in the porous body-preparing step.

16. A water-absorbing material, comprising the interconnected cell porous body according to claim 1.

17. A water-absorbing material, comprising an interconnected cell porous body produced by the method according to claim 7.

18. The interconnected cell porous body according to claim 2, wherein the powder has a bulk density of 0.001 g/cm$^3$ or more and 0.1 g/cm$^3$ or less.

19. The interconnected cell porous body according to claim 2, wherein the powder has an average diameter of 100 μm or more and 2,000 μm or less.

20. The interconnected cell porous body according to claim 3, wherein the powder has an average diameter of 100 μm or more and 2,000 μm or less.

\* \* \* \* \*